(12) United States Patent
Bagur et al.

(10) Patent No.: US 12,543,077 B2
(45) Date of Patent: Feb. 3, 2026

(54) REDUCING UNNECESSARY ROAM SCAN BEHAVIOR

(71) Applicant: ZEBRA TECHNOLOGIES CORPORATION, Lincolnshire, IL (US)

(72) Inventors: Prashanth Venkataramaiah Bagur, Bangalore (IN); Deepak Marian Francis Sams, Bangalore (IN); Satheesh Rajamanickam, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 427 days.

(21) Appl. No.: 17/992,712

(22) Filed: Nov. 22, 2022

(65) Prior Publication Data
US 2024/0172053 A1    May 23, 2024

(51) Int. Cl.
H04B 17/318    (2015.01)
H04W 36/00    (2009.01)

(52) U.S. Cl.
CPC ...... *H04W 36/0058* (2018.08); *H04B 17/318* (2015.01); *H04W 36/00835* (2018.08); *H04W 36/00837* (2018.08)

(58) Field of Classification Search
CPC .... H04B 17/30; H04B 17/309; H04B 17/318; H04W 36/0005; H04W 36/0055; H04W 36/0058; H04W 36/0083; H04W 36/00833; H04W 36/00835; H04W 36/008355; H04W 36/008357; H04W 36/00837; H04W 36/0085; H04W 36/0088; H04W 36/0094
See application file for complete search history.

(56) References Cited

U.S. PATENT DOCUMENTS

| 2010/0172274 | A1* | 7/2010 | Wu | H04W 48/16 370/311 |
| 2017/0064618 | A1* | 3/2017 | Katar | H04L 43/16 |
| 2020/0015140 | A1* | 1/2020 | Nam | H04W 36/0061 |
| 2023/0337044 | A1* | 10/2023 | Kucharewski | H04W 28/02 |

* cited by examiner

*Primary Examiner* — Matthew W Genack

(57) ABSTRACT

Reducing unnecessary roam scan behavior is provided via measuring, by a client device, network conditions in an environment in which the client device is currently connected to a first Access Point (AP); in response to determining that the client device allows roaming from the first AP and that the network conditions satisfy a roam scan condition: initiating the roam scan to identify at least one signal strength of one or more APs in the environment; and adjusting, by the client device, the roam scan condition to perform a subsequent roam scan, wherein the roam scan condition includes an upper boundary and a lower boundary based on the at least one signal strength identified during the roam scan.

17 Claims, 8 Drawing Sheets

REDUCING UNNECESSARY ROAM SCAN BEHAVIOR

BACKGROUND

A wireless computing device may perform a roam scan to identify which Access Points (APs) implementing a wireless network offer the strongest signal to the user device, and should therefore be used by the wireless computing device to connect to the wireless network. Such roam scan operations consume battery life and network bandwidth, and reduce the operational efficiency (e.g., dropping packets, introducing jitter) of the applications running on the wireless computing device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
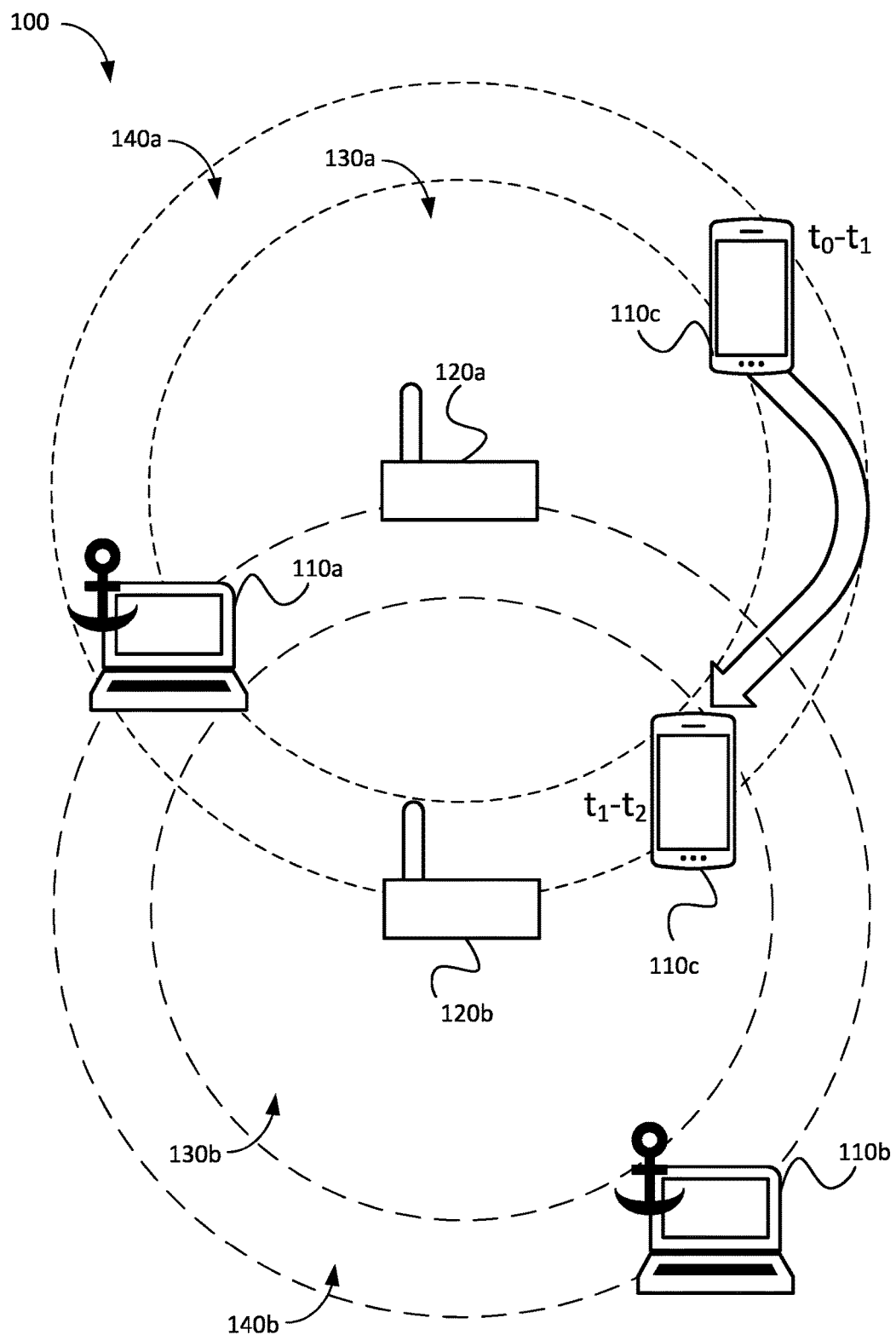
FIG. 1 illustrates an example wireless networking environment, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides for reducing unnecessary roam scan behavior in wireless communications devices by locally identifying when roam scan behavior should be (temporarily) disabled or re-enabled for an individual device based on dynamic environmental conditions. In some examples, reducing unnecessary roam scan behavior can reduce power consumption in client devices, thereby extending the battery life of battery-operated devices, as the client device may spend less power scanning different channels for candidate Access Points (APs) to connect to. In some examples, reducing unnecessary roam scan behavior can reduce packet loss and jitter as the client device does not need to leave the current channel to scan for additional candidate APs to connect to. Other advantages and improvements offered by the present disclosure will be clear on a detailed reading of the present disclosure.

To provide these and other benefits, the present disclosure provides for a roam scan hold range that a client device sets based on observed signal strengths for an AP that the client device determines to be connected with after performing a roam scan operation. For example, when the observed signal strength $X_0$ for the AP at time to falls below an initial roam threshold $Roam_0$, and the client device determines to remain connected to that AP after performing a roam scan operation, the client device defines a roam scan hold range based on the observed signal strength $X_0 < Roam_0$ to have an upper boundary $(X_0+A)$ and a lower boundary $(X_0-B)$. Accordingly, the client device may avoid performing a roam scan operation at time $t_1$ when the signal strength is less than the initial roam threshold, but within the roam scan hold range (e.g., $X_1 < Roam_0$ and $X_0-B < X_1 < X_0+A$). This roam scan hold range falls within default or manufacturer defined roaming thresholds (e.g., $Roam_0$ for a minimum signal strength before initiating a roam scan operation and $Floor_0$ for a minimum signal strength to maintain a connection), which are constant values, and allows for the client device to dynamically react to changing network conditions with minimal computational overhead, while also reducing the number of roam scan operations performed while networking conditions remain consistent.

Unlike fixed or predetermined handover or scan ranges defined to account for signal hysteresis, the upper and lower boundaries for the roam scan hold range are dynamically adjusted based on changing network conditions identified during the last roam scan operation. For example, the client device may compare the signals strengths $X_1$, $X_2$, and $X_3$ from respective times $t_1$, $t_2$, and $t_3$ against the same roam scan hold range defined around the observed signal strength $X_0$ at time $t_0$ (e.g., $X_0+A$ and $X_0-B$) until a signal strength exceeds the upper boundary or falls below the lower boundary. If at time $t_4$ the client device observes a signal strength $X_4$ is greater than the upper boundary (e.g., $X_4 > X_0+A$) or is less than the lower boundary (e.g., $X_4 < X_0-B$), the client device performs a roam scan operation. If the signal strength $X_4$ is still less than the initial roam threshold $Roam_0$ and above a floor value $Floor_0$ for a minimum signal strength, and the client device determines to maintain the connection with the current AP, the client device updates the roam scan hold range based on signal strength $X_4$ to reflect the updated networking conditions. Accordingly, in this example, after time $t_4$ the client device sets the upper boundary to $X_4+A$ and the lower boundary to $X_4-B$ to thereby avoid performing unnecessary roam scan operations at times $t_5$, $t_6$, $t_n$, etc. in the current networking conditions when the associated signal strengths $X_5$, $X_6$, $X_n$ are within the updated roam scan hold range (and no other triggering conditions have occurred).

Examples disclosed herein are directed to a method for performing a series of operations, a system including a processor and a memory including instructions to that when executed by the processor perform a series of operations, an a non-transitory computer readable storage device that stores instructions that when executed by a processor perform a series of operations, wherein the operations include: measuring, by a client device, network conditions in an environment in which the client device is currently connected to a first Access Point (AP); in response to determining that the client device allows roaming from the first AP and that the network conditions satisfy a roam scan condition: initiating the roam scan to identify at least one signal strength of one or more APs in the environment; and adjusting, by the client device, the roam scan condition to perform a subsequent roam scan, wherein the roam scan condition includes an upper boundary and a lower boundary based on the at least one signal strength identified during the roam scan.

In some embodiments, the network conditions include a first received signal strength indicator (RSSI) for the first AP; the client device determines that the roam scan condition is satisfied by identifying that the first RSSI is below an initial lower boundary for the roam scan hold range; the upper boundary is lower than an initial upper boundary of the roam scan hold range; and the lower boundary is lower that the initial lower boundary.

In some embodiments, no other APs besides the first AP are observable by the client device within the environment.

In some embodiments, the network conditions include a first RSSI for the first AP; the client device determines that the roam scan condition is satisfied by identifying that the first RSSI is above an initial upper boundary for the roam scan hold range; the upper boundary is higher than the initial upper boundary; and the lower boundary is higher that an initial lower boundary of the roam scan hold range.

In some embodiments, the network conditions include a changed location of the client device in the environment; and the client device determines that the roam scan condition is satisfied in response to the client device moving a threshold distance in the environment or entering a new area defined in the environment.

In some embodiments, the operations further include: measuring, after adjusting the roam scan hold range, second network conditions; in response to determining both that the client device allows roaming from the first AP and that that the second network conditions are outside of the roam scan hold range as adjusted: initiating the subsequent roam scan to identify additional signal strengths for available APs in the environment, including a second signal strength for the first AP; in response to determining to remain connected to the first AP based on the additional signal strengths observed during the subsequent roam scan: maintaining, by the client device, the connection to the first AP; and adjusting, by the client device, the roam scan hold range as an updated roam scan condition to perform a next roam scan, wherein the roam scan hold range includes a second upper boundary based on the second signal strength and a second lower boundary based on the second signal strength.

In some embodiments, the operations further include: measuring, after adjusting the roam scan hold range, second network conditions; in response to determining both that the client device allows roaming from the first AP and that that the second network conditions are outside of the roam scan hold range as adjusted: initiating the subsequent roam scan to identify additional signal strengths for available APs in the environment, including a second signal strength for the first AP and a third signal strength from a second AP; in response to determining to connect to the second AP based on the additional signal strengths observed during the subsequent roam scan and the third signal strength exceeding the second signal strength by at least a re-association threshold: disconnecting, by the client device, the connection with the first AP; establishing, by the client device, a second connection to the second AP; and adjusting, by the client device, the roam scan hold range as an updated roam scan condition to perform a next roam scan, wherein the roam scan hold range includes a second upper boundary based on the third signal strength and a second lower boundary based on the third signal strength.

In some embodiments, the client device allows roaming from the first AP in response to at least one of: the first AP providing a non-metered connection or the client device permitting roaming while connected via a metered connection; the client device has not set the first AP as sole connection point or forbidden connecting to other APs observable in the environment; the client device has consecutively connected to the first AP a threshold number of times in a corresponding number of roam scan attempts; and a location of the client device has changed by a threshold distance since a previous roam scan attempt.

Examples disclosed herein are directed to a method for performing a series of operations, a system including a processor and a memory including instructions to that when executed by the processor perform a series of operations, an a non-transitory computer readable storage device that stores instructions that when executed by a processor perform a series of operations, wherein the operations include: measuring, by a client device, network conditions in an environment in which the client device is currently connected to a first Access Point (AP); in response to determining both that the client device allows roaming from the first AP and that the network conditions satisfy a roam scan condition to perform a roam scan; initiating the roam scan to identify signal strengths for available APs in the environment, including a first signal strength for the first AP; in response to determining to remain connected to the first AP based on the signal strengths observed during the roam scan: maintaining, by the client device, a connection with the first AP; and adjusting, by the client device, a roam scan hold range as a candidate roam scan condition to perform a subsequent roam scan, wherein the roam scan hold range includes an upper boundary based on the first signal strength and a lower boundary based on the first signal strength.

FIG. 1 illustrates an example wireless networking environment 100, according to embodiments of the present disclosure. The wireless networking environment 100 includes several client devices 110a-c (generally or collectively, client device 110) that are connected to Wireless Local Area Networks (WLANs) offered by one or more APs 120a-b (generally or collectively, AP 120). In various examples, the WLANs can include networks based on the Institute of Electrical and Electronics Engineers (IEEE) 802.11 family of standards (e.g., one or more Wi-Fi™ networks). Although illustrated with three client devices 110a-c and two APs 120a-b, in various examples more or fewer of each type of device may be included in a wireless networking environment 100. Each of the client devices 110 and APs 120 may be understood as instances of a computing device, such as computing device 400 discussed in greater detail in relation to FIG. 4 herein.

Each of the APs 120 offers network coverage in associated ranges from where the AP 120 is located in the environment 100. Although illustrated as generally circular and projecting centrally from an associated AP 120, various features in the environment, directionally tuned antennas, the presence of interference sources, and the like may affect the direction and extent of the coverage range of a given AP 120. Generally, because the signal strength of a wireless transmission decreases as a function of distance from the signal source, the same signal will be observed with a higher strength by a listener closer to the signal source than a listener further from the signal source. Accordingly, the first AP 120a is shown with a first high-strength range 130a (generally or collectively high-strength range 130) and a first low-strength range 140a (generally or collectively low-strength range 140) and the second AP 120b is shown with a second high-strength range 130b and a second low-strength range 140b.

For purposes of the examples given herein, the high-strength ranges 130 represent the areas served by the respective AP 120 in which signals are received by client device 110 having a Received Signal Strength Indicator (RSSI) at or above a roaming threshold, while the low-strength ranges 140 represent the areas served by the respective AP 120 in which signals are received by client device 110 having an RSSI below a roaming threshold, but high enough to maintain a connection with the AP 120. For example, when a client device 110 includes a roaming trigger of −X dBm (decibel-milliwatts), the illustrated line for the high-strength ranges 130 may represent the −X dBm boundary for the associated AP 120. Similarly, the illustrated line for the low-strength ranges 140 may represent a −Y dBm boundary for the associated AP 120 at which the client device 110 may no longer reliably connect to that AP 120. Accordingly, the low-strength range 140 represents the area in which network service from the AP 120 is available to the client device between −X dBm and −Y dBm.

As used in the present disclosure, various RSSI values are discussed in relation to dBm, but other units and/or scales (e.g., AP-manufacture specific scales, with or without units) may be used to measure and compare various signal strengths to identify which signals are stronger than others or are within or outside of a given range.

When a client device 110 connected to an AP 120a is located in the respective low-strength range 140, the client device 110 may periodically perform a roam scan operation to determine whether any other APs 120 in the environment 100 offer a wireless network connection that is stronger than the connection offered by the currently connected-to AP 120. However, not all roam scan operations may result in locating another AP 120 with a stronger connection. For example, the first client device 110a is illustrated as being located inside the first low-strength range 140a, and inside the second low-strength range 140b, so there may be no one better AP 120 to serve the first client device 110a despite being outside of a high-strength range 130 of the currently connected first AP 120a. In another example, a second client device 110b is illustrated as being located outside of the high-strength range 130b of the second AP 120b and in range of no other AP 120. In each of these examples, the RSSIs from the connected AP 120 may satisfy the roaming trigger for the client device 110, but the currently connected-to AP 120 may offer the best or only RSSI, thereby resulting in the client device 110 maintaining a connection to the same AP 120 after the roam scan operation; thereby using power and bandwidth for no discernable improvement in the network connection.

In another example, a third client device 110c is illustrated as being located inside of the first low-strength range 140a from time $t_0$ to time $t_2$, and located within the second high-strength range 130b from time $t_1$ to time $t_2$. If a roam scan operation is initiated between time $t_0$ to time $t_1$, the third client device 110c would reconnect to the first AP 120a, whereas if a roam scan operation is initiated between time $t_1$ to time $t_2$, the third client device 110c would connect to the second AP 120b to receive a stronger connection than with the first AP 120a.

In each of the illustrated cases, if the client devices 110 were able to deduce that the current connected AP 120 offers the best signal strength for the current conditions observed by the client device 110, the client device 110 would be able to forego or otherwise avoid performing a roam scan operation until the conditions change. These conditions may include changes in signal strength from the connected AP 120, the location of the client device 110, the type of connection established between the AP 120 and the client device 110 (e.g., metered vs. non-metered), network configuration, and the like.

Figure 2:
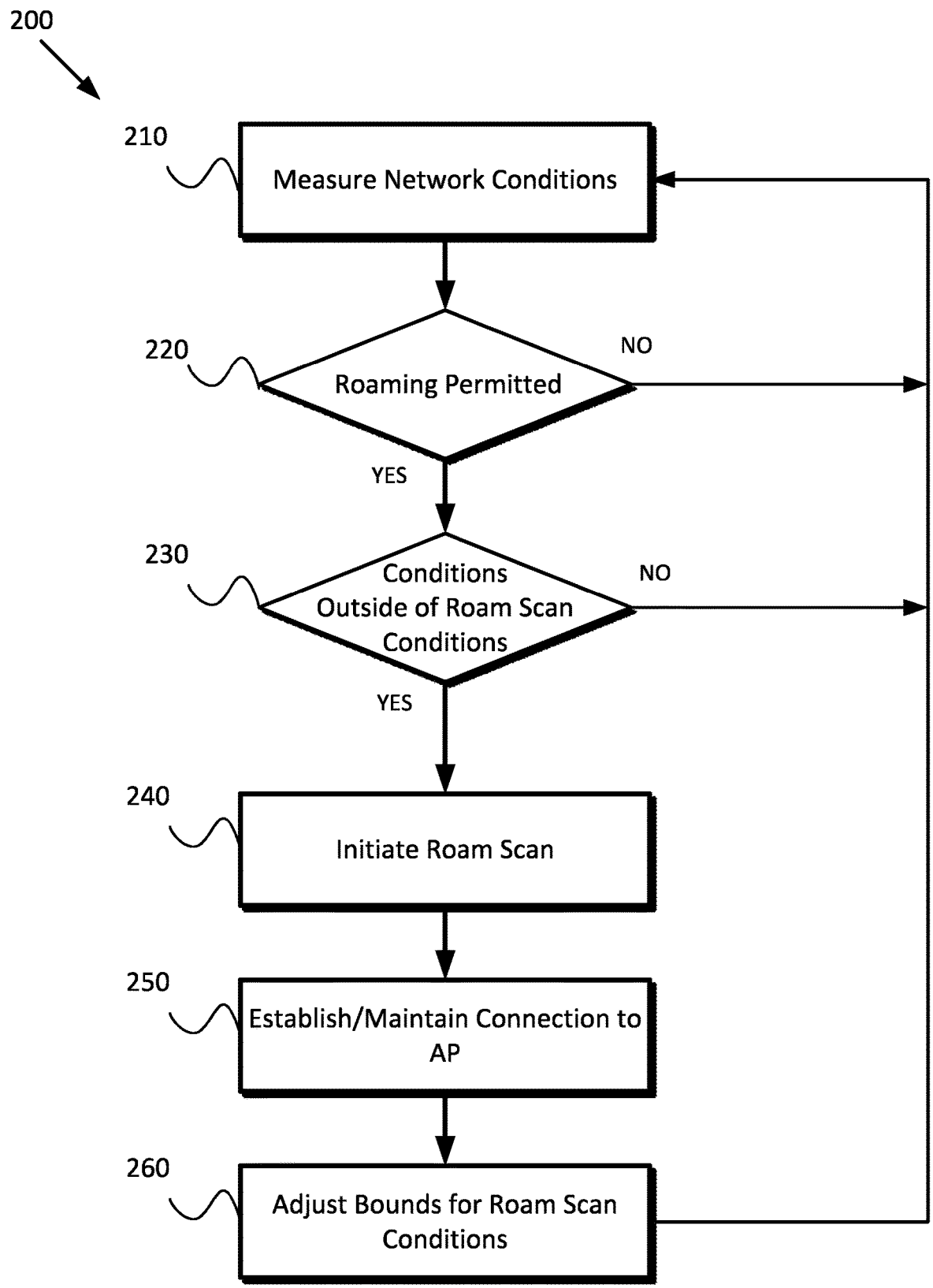
FIG. 2 is a flowchart of an example method for a client device to reduce unnecessary roam scan behavior, according to embodiments of the present disclosure

FIG. 2 is a flowchart of an example method 200 for a client device 110 to reduce unnecessary roam scan behavior, according to embodiments of the present disclosure. Method 200 begins at block 210, where the client device 110 measures network conditions in an environment in which the client device 110 is currently connected to a first AP 120a. In various embodiments, the network conditions include an RSSI or other signal strength indicator for the first AP 120a. In various embodiments, the network conditions may also include, a number of APs 120 observable by the client device 110, the presence of interference sources on a channel used by the client device 110, whether special networking conditions exist (e.g., maintenance modes), a location of the client device 110, current frequency band and/or channels being used by the client device 110, channel width, level of channel congestion, a country indicator as, for example, advertised in the CountryIE Information Element of the IEEE 802.11 standard-based messaging structure, as well as a count of prior failed association attempts for a particular AP based on a specific Basic Service Set Identifier (BSSID). In an embodiment, one or more of the above network conditions are used to derive a score and roaming may be triggered when the score is compared to a predetermined threshold.

At block 220, the client device 110 determines whether the client device 110 allows roaming from the first AP 120a. In various embodiments, the client device 110 be configured to not allow roaming from the first AP 120a when the first AP 120a provides a metered connection (e.g., when using a hotspot as the first AP 120a) or when the client device 110 is configured to use a specified AP 120 or avoid using other specified APs 120. In some embodiments, the client device 110 is configured to permit performing a roam scan up to n times until the client device 110 has consecutively connected to the same AP 120 a threshold number of times in a corresponding number of roam scan attempts (e.g., n out of n roam scans). In some embodiments, the client device 110 is configured to re-permit performing roam scans (e.g., after disabling roam scans) after moving a threshold distance since a previous roam scan attempt or being located in a different mapped location or region, which may be determined using a Global Positioning System (GPS) receiver, an indoor locational service, changes in the presence (or absence) of various wireless beacons observable by the client device 110, or the like, and combinations thereof. In some embodiments, the client device 110 is configured to re-permit performing roam scans (e.g., after disabling roam scans) after establishing a new connection with a different AP 120, disconnecting from the current AP 120 (e.g., in response to losing a signal), changing a connection type (e.g., metered to non-metered), or the like, and combinations thereof.

When the client device 110 does not permit roaming in the current iteration of method 200, method 200 returns to block 210 for the client device 110 to perform the next iteration in response to receiving a next trigger to evaluate whether to roam. When the client device 110 does permit roaming in the current iteration of method 200, method 200 proceeds to block 230.

At block 230, the client device 110 determines whether the current network conditions are outside of a roam scan hold range set by the client device 110. The roam scan hold range may be adjusted based on previously observed network conditions values from the connected AP 120 to have different upper boundaries and a lower boundaries over time. For example, at current time $t_C$ the client device 110 may compare a signal strength of $X_c$ against an upper boundary and a lower boundary set at a previous time $t_p$ based on an observed signal strength of $X_p$. As used herein, the upper boundary refers to the higher signal strength boundary of the roam scan hold range, and the lower boundary refers to the lower signal strength boundary of the roam scan hold range. In various embodiments, the roam scan hold range can be set based around preset values for when to initiate a roam scan (e.g., $Roam_0$) or a floor value to maintain a connection to an AP 120 (e.g., $Floor_0$) such that the upper boundary does not exceed $Roam_0$ and the lower boundary does not fall below $Floor_0$. In embodiments where the signal strength (e.g., an RSSI value) of the connected AP 120a is monitored as part of the network conditions, the upper boundary and lower boundary are set based on the observed signal strength of the first AP 120a from the last time the roam scan hold range was adjusted (e.g., per block 260). For example, when the client device 110 last attempted to roam from the first AP 120a when the signal from the AP 120a exhibited an RSSI of −75 dBm (e.g., $X_p$=−75 dBm), the upper boundary may be −70 dBm and the lower boundary −80 dBm when using offsets of ±5 dBm (e.g., $X_p$+5 dBm and $X_p$−5 dBm). In another example, an upper boundary of −70 dBm and a lower boundary of −80 dBm can be based on an observed RSSI for the first AP 120a of −77 dBm (e.g., $X_p$=−77 dBm) with offsets of +7 dBm and −3 dBm, respectively (e.g., $X_p$+7 dBm and $X_p$−3 dBm).

The offsets (e.g., +A, −B) used from the basis signal strength may be configured to various values by the administrative users of the client devices 110. In some embodiments, the offset used for the upper boundary (A) is configured such that the upper boundary does not exceed the signal strength of an initial roaming trigger for the client device 110 (e.g., $X_1$+A≤$Roam_0$, where $Roam_0$ defines the edge of the high-strength range 130 shown in FIG. 1). In some embodiments, the offset used for the lower boundary (B) is configured such that the lower boundary does not fall below a minimum signal strength needed to remain connected to an AP 120 (e.g., $X_1$−B≥$Floor_0$, where $Floor_0$ defines the edge of the low-strength range 140 shown in FIG. 1). When the client device determines that the signal strength for the first AP 120a is outside of the roam scan hold range, method 200 proceeds to block 240, otherwise, method 200 returns to block 210 to perform the next iteration of method 200.

Although the present examples generally refer to setting the boundaries for the hold range threshold and measuring the signal strength for comparison against the hold range threshold at given times (e.g., signal strength $X_1$ at time $t_1$ to compare against threshold values set at time $t_0$ based on signal strength $X_0$), in some embodiments the signal strength measurements may include an average value determined across a sampling interval. For example, after setting the roam scan hold range at time $t_0$ based on the signal strength $X_0$ observed with the connected AP 120 at time $t_0$ (e.g., as $X_0$+A as the upper boundary and $X_0$−B as the lower boundary), the client device 110 maintains the upper and lower boundaries as set at time $t_0$ indefinitely or until the next roam scan is triggered (e.g., the signal strength observed by the client device 110 falls outside of the roam scan hold range). The client device 110 may take an instantaneous measurement of signal strength $X_C$ at the current time $t_C$ for use as $X_0$ or $X_1$, respectively, or use an averaged value taken over a sampling interval (of n samples) from time $t_{C-n}$ to time $t_C$ for use as $X_0$ or $X_1$, respectively. For example, the average measurement for the current signal strength $X_C$ at time $t_C$ may be calculated according $t_0$ Formula 1 or Formula 2, where n is the number of sampling intervals in a window and f(t) is a decay function based on time.

$$X_C = (X_C + X_{C-1} + X_{C-2} + X_{C-3} + \ldots X_{C-n})/n \qquad \text{Formula 1}$$

$$X_C = f(t_C)X_C + f(t_{C-1})X_{C-1} + f(t_{C-2})X_{C-2} + f(t_{X-3})X_{C-3} + \ldots$$
$$f(t_{C-n})X_{C-n} \qquad \text{Formula 2}$$

Accordingly, the initial comparison for whether to perform a roam scan may be based on an instantaneous value for signal strength $X_0$ measured at time $t_0$, or an average value for $X_0$ sampled from time $t_{0-n}$ to time $t_0$ (e.g., whether $X_0$<$Roam_0$ per block 230). Similarly, in later comparisons after determining to adjust the bounds of the roam scan hold range initially set at time $t_0$ (e.g., per block 260), the client device 110 may measure the current network conditions in a later iteration of method 200 to include an instantaneous value or an average value for signal strength $X_1$ at time $t_1$ (e.g., whether $X_1$<$X_0$−A or $X_1$>$X_0$+B per block 230). At block 240, the client device 110 initiates a roam scan. When performing a roam scan, the client device 110 sends probe packets to identify candidate APs 120 on several channels. In some examples, switching among these several channels from a current channel results in the client device 110 waking from a sleep or standby mode and consuming battery power or drawing additional power from another power source. In some examples, switching among these several channels results in transmission and reception delays of data-carrying packets for applications or programs running on the client device 110, which may introduce lag, jitter, or dropped packets in the transmissions. Additionally, the APs 120 (when responding to the probe packets) schedule transmission times on various channels, which uses available bandwidth and may delay other client devices 110 from receiving or transmitting data packets during those times, which may introduce lag, jitter, or dropped packets for transmissions to the other client devices 110. Accordingly, in situations where the client device 110 can determine that a roam scan is unnecessary, avoiding performance of a roam scan can improve the efficiency of the client device 110 itself, improve the efficiency of other client devices 110 and the APs 120 in the environment, and reduce bandwidth usage in the environment, among other benefits.

At block 250, the client device 110 establishes a connection with a new AP 120 or maintains a connection with the current AP 120. Once the client device 110 receives a threshold number of responses to the probe packets, or waits a threshold amount of time to receive responses to the probe packets from any available APs 120 in the environment (per block 240), the client device 110 identifies which AP 120 offers a preferred connection. In some examples, the AP 120 offering the preferred connection is the AP 120 with the highest signal strength value, or an AP 120 with the highest signal strength that also exceeds the current AP's signal strength value by at least re-association threshold (e.g., to associate the client device 110 with a new AP 120 only when the new AP's signal strength exceeds the first AP's signal strength by at least X dBm). In some examples, the client device 110 may evaluate other factors for the connection (e.g., channel used, number of other client devices 110 served by the AP 120, connection type, security of the AP 120, whether the second AP 120b belongs to a shared WLAN with the first AP 120a or a different WLAN, etc.) to gauge which candidate AP 120 offers the preferred connection. In various examples, the determination to maintain a current connection or establish a new connection can vary in different implementations of method 200, which may include consideration of some or all of the factors described herein, and other factors set by the device manufacturers or end users.

At block 260, the client device 110 adjusts the bounds for a roam scan hold range based on the observed networking conditions in the current iteration of method 200. Method 200 may then return to block 210 for the next iteration of monitoring network conditions.

For example, when determining to maintain the connection with the first AP 120a (per block 250) after observing a signal strength ($X_1$) from the first AP 120a below a first lower boundary (e.g., the lower boundary set at time $t_0$ based on signal strength $X_0$–B), in block 260 the client device 110 updates the upper boundary and the lower boundary (e.g., as a second upper boundary and a second lower boundary) based on the configured offsets (e.g., +A dBm, –B dBm) and the newly observed signal strength from the first AP 120a. Accordingly, the new boundaries in the next iteration of method 200 are adjusted to $X_1$+A and $X_1$–B, when previously the boundaries may have been a preconfigured initial roam threshold (e.g., $Roam_0$ for the lower boundary and null for the upper boundary) or based on the previously observed signal strengths (e.g., $X_0$) from the first AP 120a (e.g., $X_0$+A and $X_0$–B). By dynamically adjusting the roam scan hold range when observing lower signal strengths from the currently connected AP 120, the client device 110 acknowledges that although the current AP 120 provides a lower strength connection than initially desired, that AP 120 offers the best connection under current network conditions, and absent a change in network conditions, any further roam scans would be unnecessary as the client device 110 would maintain the connection to the currently connected AP 120 itself after performing the roam scan.

In another example, when determining $t_0$ maintain the connection with the first AP 120a (per block 250) after observing a signal strength ($X_1$) from the first AP 120a above a first upper boundary (e.g., the upper boundary set at time $t_0$ based on signal strength $X_0$+A), in block 260 the client device 110 updates the upper boundary and the lower boundary using the configured offsets (e.g., +A dBm, –B dBm) and the observed signal strength from the first AP 120a. Accordingly, the new boundaries (e.g., a second upper boundary and a second lower boundary) in the next iteration of method 200 are adjusted $t_0$ $X_1$+A and $X_1$–B, when previously the boundaries were based on the previously observed signal strengths ($X_0$) from the first AP 120a (e.g., $X_0$+A and $X_0$–B). By dynamically adjusting the roam scan hold range when observing higher signal strengths from the currently connected AP 120, the client device 110 acknowledges that although the current AP 120 provides a lower strength connection than initially desired (e.g., $X_1$<$Roam_0$), the network conditions have changed since initially lowering the roam scan hold range (e.g., $X_0$+A<$X_1$<$Roam_0$). Accordingly, in future iterations of method 200, the client device 110 may benefit from performing a roam scan (e.g., $t_0$ identify a different AP 120 to connect $t_0$) with the higher boundaries when previously no such benefit could be expected. Therefore, the client device 110 can react to network conditions improving, not only for the connected AP 120, but for other APs 120 in the environment, which may experience greater improvements than the currently connected AP 120 (e.g., due the client device 110 moving in the environment, localized interference sources having different effects on the different APs 120, etc.).

In another example, when determining $t_0$ not maintain the connection with the first AP 120a and $t_0$ instead establish a new connection with a second AP 120b (e.g., per block 250) in response $t_0$ observing the signal strength ($X_1$) from the first AP 120a is outside of the roam scan hold range and that the signal strength ($Y_1$) from the second AP 120b is better than the signal strength ($X_1$) from the first AP 120a, the client device 110 may use the signal strength of the second AP ($Y_1$) as a basis for an updated roam scan hold threshold (e.g., $Y_1$+A, $Y_1$–B) or reset $t_0$ using a baseline or default roam trigger (e.g., $Roam_0$ for the lower boundary and null for the upper boundary).

FIGS. 3A-3E illustrate several example scenarios for dynamically updating roaming criteria based on environmental conditions to avoid or reduce unnecessary roam scan behavior in a client device 110, according to embodiments of the present disclosure. In each of FIGS. 3A-3E, a client device 110 and two APs 120a-b are illustrated (although in FIG. 3D, the second AP 120b may be omitted) at three different times with the roam scan conditions 310a-c (generally of collectively roam scan condition 310) in the environment shown that cause the client device 110 to evaluate whether to maintain an existing connection to one AP 120, or establish a new connection with the other AP 120. The signal strengths 320a-f for the respective APs 120, as observable by the client device 110, the upper boundaries 330a-c (generally or collectively, upper boundary 330) and lower boundaries 340a-c (generally or collectively, lower boundary 340) that the client device 110 updates to after analyzing the signal strengths 320, and roam evaluation criteria 350a-c (generally or collectively, roam evaluation criteria 350) used by the client device 110 to decide whether or how to roam are also shown. Although the examples provided herein discuss the use of signal strength as one roam evaluation criteria 350, in various embodiments, in addition to or alternatively to considered the signal strengths of the available APs 120, the results of the roam scan used to determine whether the maintain an existing connection or establish a new connection can include, but are not limited to: network congestion (e.g., a number of client devices 110 connected to a certain AP 120), client priority ratings at the connected AP 120, duration of the connection between the client device 110 and the AP 120, an amount of data sent or received over the current connection (e.g., in relation to data caps or to preferentially serve more/less active clients), whether the client device 110 possesses alternative wireless communication technologies, whether the channel used for the connection is contested by another AP 120 or an alternative user of the channel, a time of day, and combinations thereof.

Figure 3A:
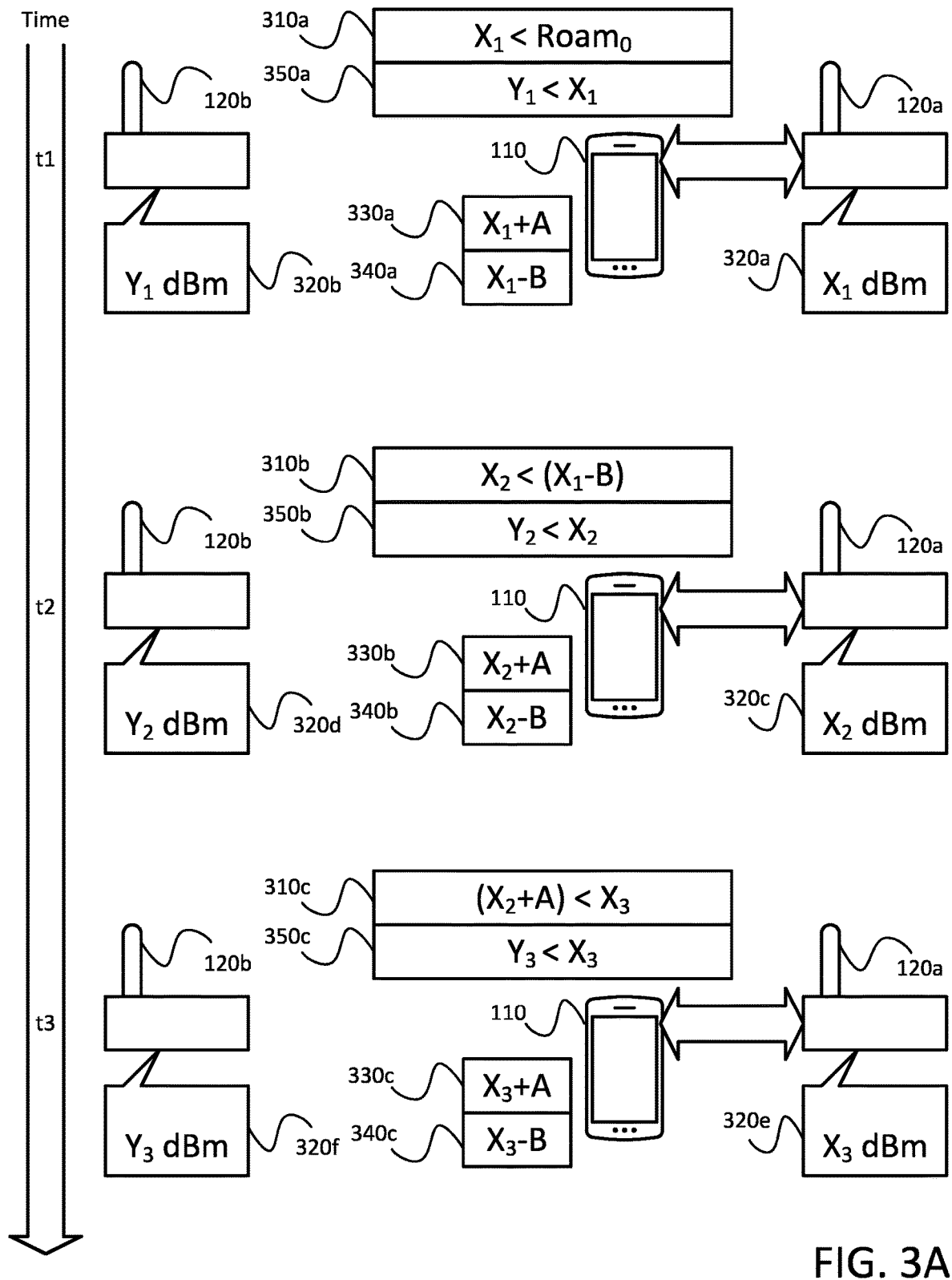
FIGS. 3A-3E illustrate several example scenarios for dynamically updating roaming criteria based on environmental conditions to avoid or reduce unnecessary roam scan behavior in a client device, according to embodiments of the present disclosure

In FIG. 3A, the client device 110 observes a first roam scan condition 310a that the signal strength 320a of the first AP 120a (to which the client device 110 is currently connected) is below an initial roam threshold, which may cause the client device 110 to perform a first iteration of method 200, as discussed in relation to FIG. 2. At this first time $t_1$, the roam evaluation criteria 350a indicates that the first signal strength 320a of the first AP 120a is greater than the second signal strength 320b of the second AP 120b, which indicates that the client device 110 should remain connected to the first AP 120a, as no other observable AP 120 offers a superior connection strength at this time. When determining to maintain the connection to the current AP 120, the client device 110 updates the upper boundary 330a and the lower boundary 340a for use after the first time based on the observed signal strength 320a of the connected first AP 120a that triggered performance of the roam scan at the first time. Stated differently, the roam scan hold range for times $t_{1+x}$ are set based on the signal strength seen at time $t_1$ (e.g., $X_1+A$ and $X_1-B$).

At a second time $t_2$ in FIG. 3A, the client device 110 observes a second roam scan condition 310b that the signal strength 320c of the first AP 120a (to which the client device 110 is currently connected) is below the previously updated lower boundary 340a from the first time, which may cause the client device 110 to perform a second iteration of method 200, as discussed in relation to FIG. 2. At this second time, the roam evaluation criteria 350b indicates that the third signal strength 320c of the first AP 120a is greater than the fourth signal strength 320d of the second AP 120b, which indicates that the client device 110 should remain connected to the first AP 120a, as no other observable AP 120 offers a superior connection strength at this time. When determining to maintain the connection to the current AP 120, the client device 110 updates the upper boundary 330b and the lower boundary 340b for use after the second time $t_2$ based on the observed signal strength 320c of the connected first AP 120a that triggered performance of the roam scan at the second time $t_2$. Stated differently, the roam scan hold range for times $t_{2+x}$ is set based on the signal strength seen at time $t_2$ (e.g., $X_2+A$ and $X_2-B$).

At a third time $t_3$ in FIG. 3A, the client device 110 observes a third roam scan condition 310c that the signal strength 320e of the first AP 120a (to which the client device 110 is currently connected) is above the previously updated upper boundary 340b from the second time, which may cause the client device 110 to perform a third iteration of method 200, as discussed in relation to FIG. 2. At this third time, the roam evaluation criteria 350c indicates that the fifth signal strength 320e of the first AP 120a is greater than the sixth signal strength 320f of the second AP 120b, which indicates that the client device 110 should remain connected to the first AP 120a, as no other observable AP 120 offers a superior connection strength at this time. When determining to maintain the connection to the current AP 120, the client device 110 updates the upper boundary 330c and the lower boundary 340c for use after the third time $t_0$ be based on the observed signal strength 320e of the connected first AP 120a that triggered performance of the roam scan at the third time. Stated differently, the roam scan hold range for times $t_{3+x}$ are set based on the signal strength seen at time $t_3$ (e.g., $X_3+A$ and $X_3-B$).

In various embodiments, exceeding the upper boundary 330 alerts the client device 110 that networking conditions have changed, which may affect different AP 120 in the environment by different amounts or indicate that the location of the client device 110 has changed sufficiently that a new set of APs 120 are now observable. Accordingly, even though the client device 110 may still be receiving service from the currently connected AP 120 below an initial roam threshold, the improvement in service can be used to trigger a new search to identify candidate APs 120 that could offer potentially superior service based on the updated conditions.

By continuously adjusting the roam scan hold range downward (e.g., setting lower values for the lower boundary 340 for signal strengths 320 to trigger subsequent roam scan actions), the client device 110 can avoid triggering another roam scan while the currently connected-to AP 120 is offering services within previously acceptable ranges. Accordingly, small variances in signal strength 320 (e.g., less than B in magnitude) will not result in the client device 110 performing a subsequent roam scan. The client device 110 may continue adjusting the roam scan range until the lower boundary 340 falls below a minimum signal strength needed to remain connected to an AP 120 (e.g., signal strength value of $Floor_0$).

By continuously adjusting the roam scan hold range upward (e.g., setting higher values for the upper boundary 330 for signal strengths 320 to trigger subsequent roam scan actions), the client device 110 can avoid triggering another roam scan while the currently connected-to AP 120 is offering services within previously acceptable ranges. Accordingly, small variances in signal strength 320 (e.g., less than A in magnitude) will not result in the client device 110 performing a subsequent roam scan. The client device 110 may continue adjusting the roam scan range until the upper boundary 330 exceeds the initial roam threshold for the AP 120 (e.g., signal strength value of $Roam_0$) as the client device 110 has resumed operations in the high-strength range 130 of an AP 120 once the upper boundary 330 exceeds the initial roam threshold.

Figure 3B:
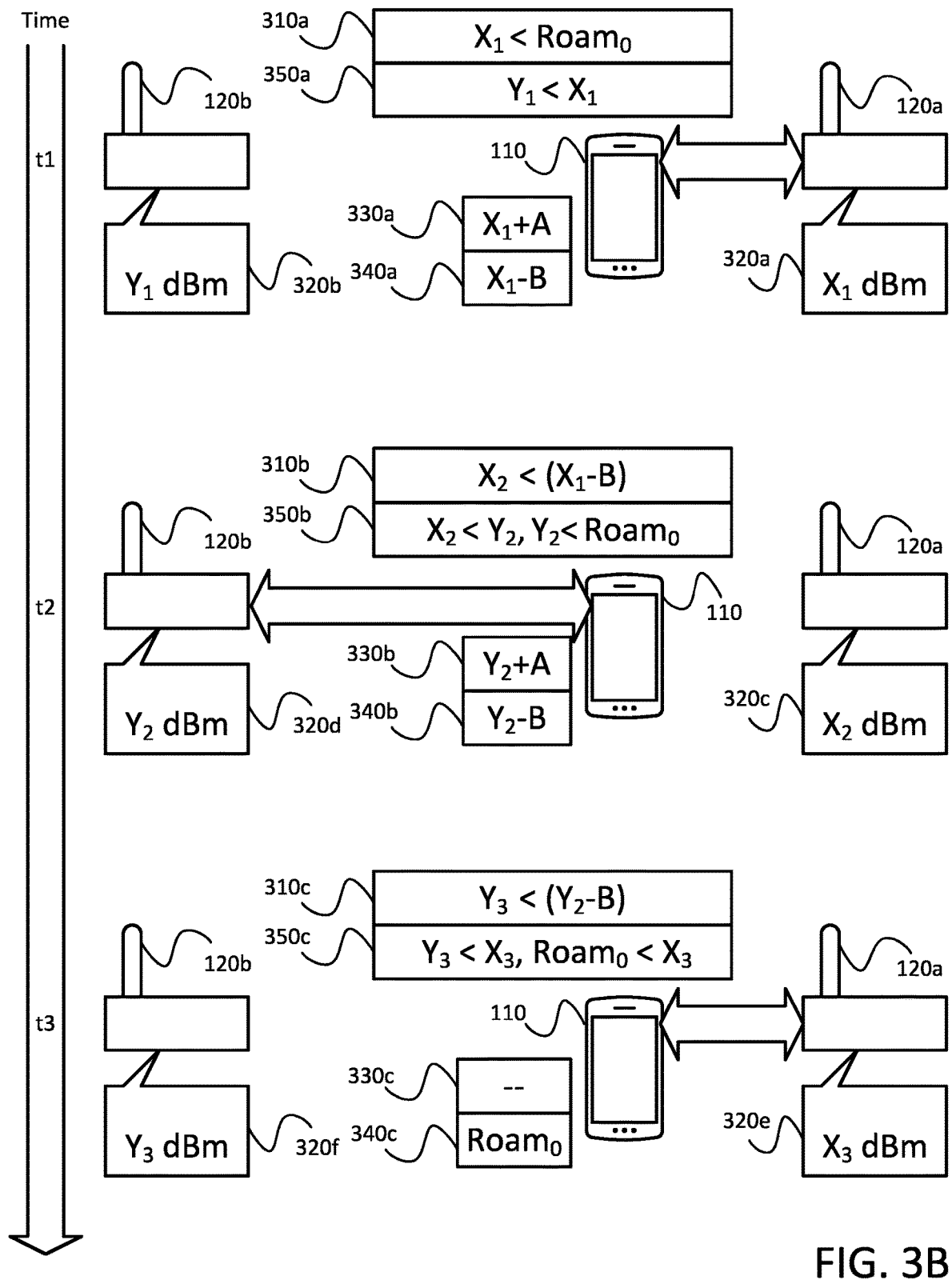

In FIG. 3B, the client device 110 observes a first roam scan condition 310a and reacts accordingly similarly to as described in relation to FIG. 3A.

At a second time in FIG. 3B, the client device 110 observes a second roam scan condition 310b that the signal strength 320c of the first AP 120a (to which the client device 110 is currently connected) is below the previously updated lower boundary 340a from the first time, which may cause the client device 110 to perform a second iteration of method 200, as discussed in relation to FIG. 2. At this second time, the roam evaluation criteria 350b indicates that the third signal strength 320c of the first AP 120a is less than the fourth signal strength 320d of the second AP 120b, which indicates that the client device 110 may receive improved service if the client device 110 disconnects from the first AP 120a and establishes a new connection with the second AP 120b. In various embodiments, the client device 110, despite potentially receiving a stronger connection with the second AP 120b than the first AP 120a at the second time, may require that the signal strength 320d of the second AP 120b (to which the client device is not currently connected) exceeds the signal strength 320c of the first AP 120a by at least a handover threshold (e.g., $Y_2>(X_2+handover)$).

In the example of FIG. 3B at the second time, the second roam evaluation criteria 350b also indicate that the second AP 120b provides a signal strength 320d below the initial roam threshold, despite offering the strongest network connection at the second time. Accordingly, the client device 110 connects to the second AP 120b and updates the upper boundary 330b and the lower boundary 340b for use after the second time based on the observed signal strength 320d of the connected second AP 120b at the second time. Stated differently, the roam scan hold range for times $t_{2+x}$ are set based on the signal strength 320 seen at time $t_2$ for the AP 120 that the client device connects to (e.g., $Y_2+A$ and $Y_2-B$) to avoid switching back and forth between multiple APs 120 with similar signal strengths 320.

At a third time in FIG. 3B, the client device 110 observes a third roam scan condition 310c that the signal strength 320f of the second AP 120b (to which the client device 110 is currently connected) is below the previously updated lower boundary 340b from the second time, which may cause the client device 110 to perform a third iteration of method 200, as discussed in relation to FIG. 2. At this third time, the roam evaluation criteria 350c indicates that the fifth signal strength 320e of the first AP 120a is greater than the sixth signal strength 320f of the second AP 120b, which indicates that the client device 110 may receive improved service if the client device 110 disconnects from the second AP 120b and establishes a new connection with the first AP 120a. In various embodiments, the client device 110, despite potentially receiving a stronger connection with the first AP 120a than the second AP 120b at the third time, may require that the signal strength 320e of the first AP 120a (to which the client device is not currently connected) exceeds the signal strength 320f of the second AP 120b by at least a handover threshold (e.g., $Y_3 > (X_3 + \text{handover})$) to avoid switching back and forth between multiple APs 120 with similar signal strengths 320.

In the example of FIG. 3B at the third time, the third roam evaluation criteria 350b also indicate that the first AP 120a provides a signal strength 320e above the initial roam threshold, in addition to offering the strongest network connection at the third time. Accordingly, the client device 110 connects to the first AP 120a and updates roam scan hold range to the initial values. Stated differently, the roam scan hold range for times $t_{3+x}$ are set to the initial roam threshold (e.g., $\text{Roam}_0$) for the lower boundary 340c and to null for an upper boundary 330c, as the client device 110 does not need to roam when signal strength is above the initial roam threshold.

When adjusting the roam scan hold range, the client device 110 can determine whether to use learned values for the best-available (but still below desired) signal strengths 320 or return to using the initially desired signal strengths to initiate roaming behaviors, whether maintaining a connecting with one AP 120 or establishing a new connection with a different best-available AP 120.

Figure 3C:
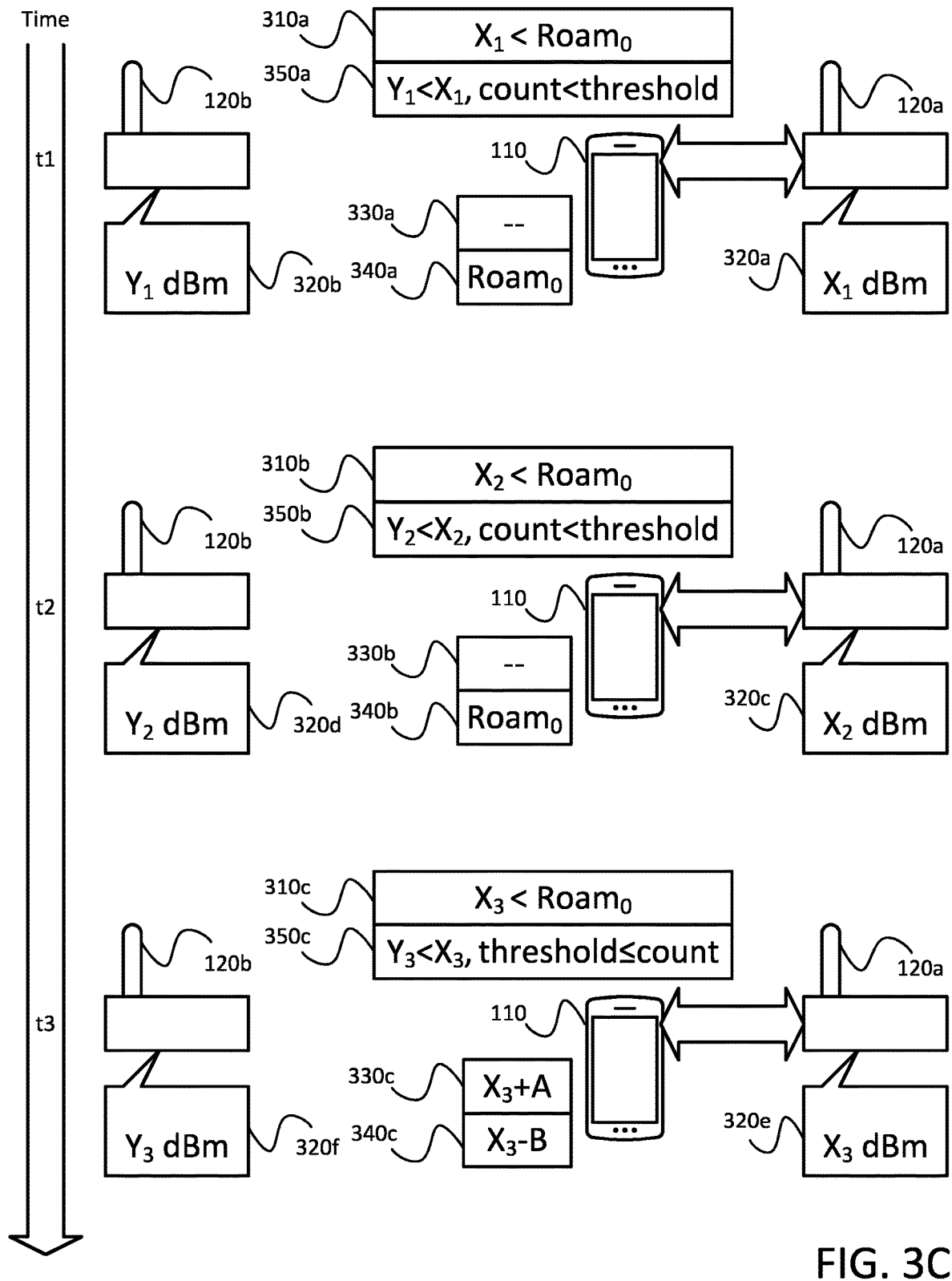

In FIG. 3C, the client device 110 observes a roam scan condition 310a at time $t_1$, and performs a roam scan, determining to remain connected to the first AP 120a based on the 340a that the first signal strength 320a from the first AP 120a exceeds the second signal strength 320b from the second AP 120b and that a roam count is below a roam blocking threshold. Accordingly, the client device 110 maintains the initial roam threshold as a lower boundary 340a for use after the first time $t_1$ and leaves the upper boundary 330a null, but increments the value for the count. The count represents a number of consecutive times that the client device 110 has performed a roam scan and determined to maintain the connected to the current AP 120. For example, by determining to remain connected to the first AP 120a at time $t_1$, the client device increments the count, but would reset the count to zero if the second AP 120b had been connected to at time $t_1$. Accordingly, at the second time, when the client device 110 observes a roam scan condition 310b that the signal strength 320c of the first AP 120a is below the initial roam threshold, the client device 110 performs a second roam scan. In response to determining to still remain connected to the first AP 120a, the client device 110 increments the count, and maintains the roam scan hold range to use the initial roam threshold and null as the lower boundary 340b and upper boundary 330b.

At a third time in FIG. 3C, the client device 110 observes a third roam scan condition 310c that the signal strength 320e of the first AP 120a (to which the client device 110 is currently connected) is below the lower boundary 340b set during the second time, which may cause the client device 110 to perform a third iteration of method 200, as discussed in relation to FIG. 2. At this third time, the roam evaluation criteria 350c indicates that the fifth signal strength 320e of the first AP 120a is greater than the sixth signal strength 320f of the second AP 120b, which indicates that the client device 110 may receive improved service if the client device 110 remains connected to the first AP 120a, similarly to the determinations at the first time and the second time. However, in this example, the count is greater than or equal to the roam blocking threshold, and the client device 110 has therefore performed at least n roam scan operations with all n attempts resulting in remaining connected to the connected-to AP 120. Accordingly, to avoid performing roam scan n+1 that may likely result in also remaining connected to the current AP 120 (which would needlessly consuming power, bandwidth, and processing resources), the client device changes the roam scan hold range to be based on the observed signal strength 320e of the connected-to first AP 120a. Stated differently, after satisfying a roam blocking threshold at time $t_3$, the client device 110 may set the roam scan hold range for times $t_{3+x}$ based on the signal strength 320 seen at time $t_3$ for the AP 120 that the client device remains connected to (e.g., $X_3+A$ and $X_3-B$) to avoid performing another roam scan until network conditions change enough change the observed signal strength of that AP 120 outside of the newly updated roam scan hold range.

Figure 3D:
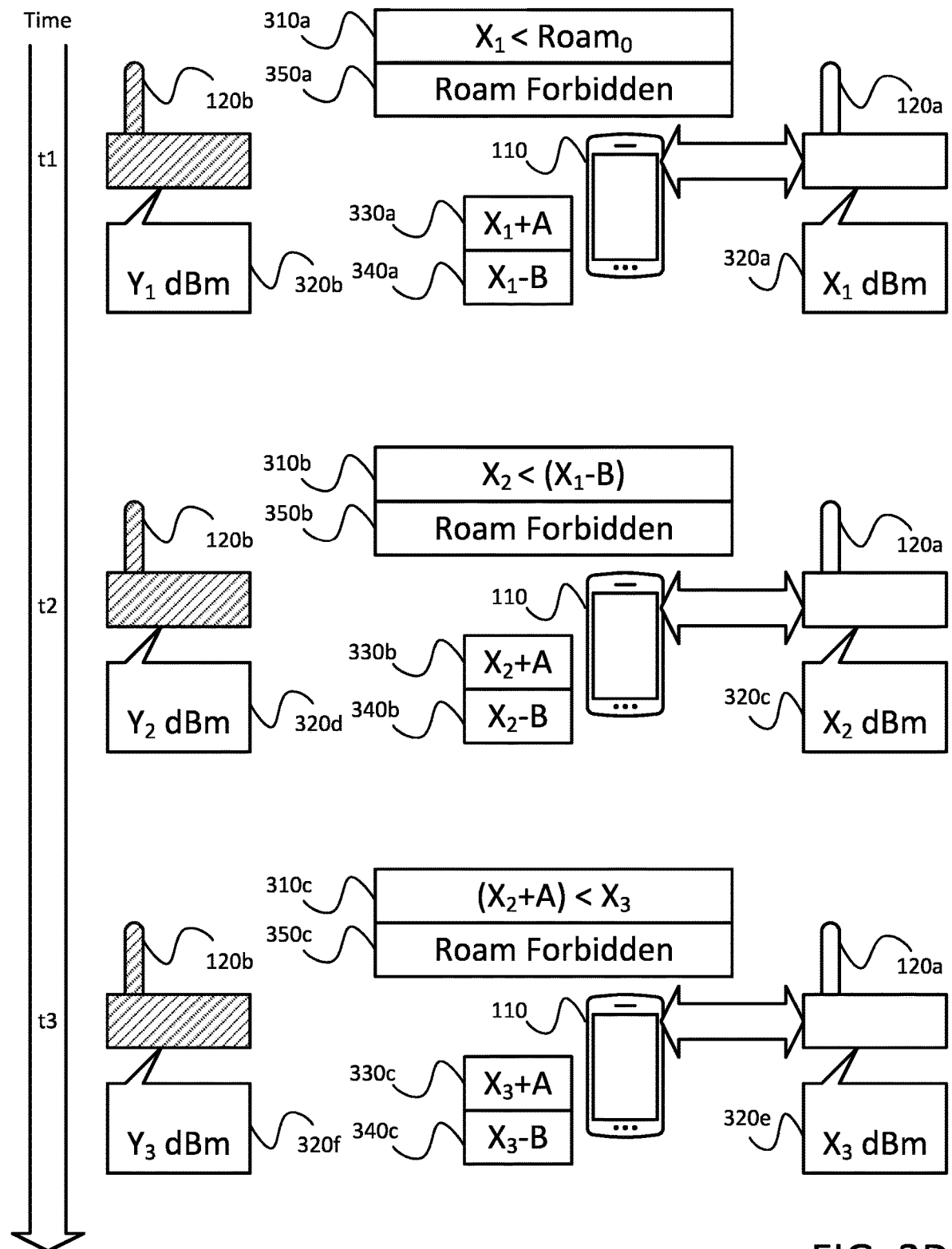

In FIG. 3D, the client device 110 observes roam scan conditions 310a-c and reacts accordingly similarly to as described in relation to FIG. 3A, but has been forbidden at time $t_1$, $t_2$, and $t_3$ to roam from the first AP 120a to another AP 120. Accordingly, the client device 110 in FIG. 3C may update the boundaries of the roam scan hold range as in FIG. 3A, but does not perform a roam scan to receive the signal strengths 320 from other APs 120, and instead uses the latest observed signal from the currently connected-to AP 120 to form the basis of the roam scan hold range.

In various embodiments, the client device 110 may forbid roaming when connected to an AP 120 with a metered connection (e.g., a hotspot) to avoid sending and receiving roam scan packets, when an application running on the client device 110 is in a lag-intolerant mode (e.g., an ongoing voice call, video conference, etc.), or a user has otherwise specified that the client device 110 should remain connected to the current AP 120 until maintaining a connection is no longer possible. In other embodiments, the client device 110 may forbid roaming when the connected-to AP 120 is known to be the only AP 120 for a given network offering network connections to a given area in the environment, for example, to avoid connecting to a new network or to avoid roaming within one network when the connected-to AP 120 is the only AP 120 known to be (at least reliably or predictably) observed by the client device 110. Other criteria may be used to temporarily forbid roaming such as a time window since the last roam scan (e.g., to enforce a spacing of at least s seconds between roam scans), a defined time period (e.g., during network maintenance), when the client device 110 is located at a known location with poor (e.g., below the initial roam threshold) service, or the like, and combinations thereof. In various embodiments, the client device 110 may cross-reference its current location against known areas mapped to various networking characteristics and use a change in location (e.g., from one area to a new area with different networking characteristics) as a roam scan condition 310 to perform a roam scan (if not otherwise forbidden).

Figure 3E:
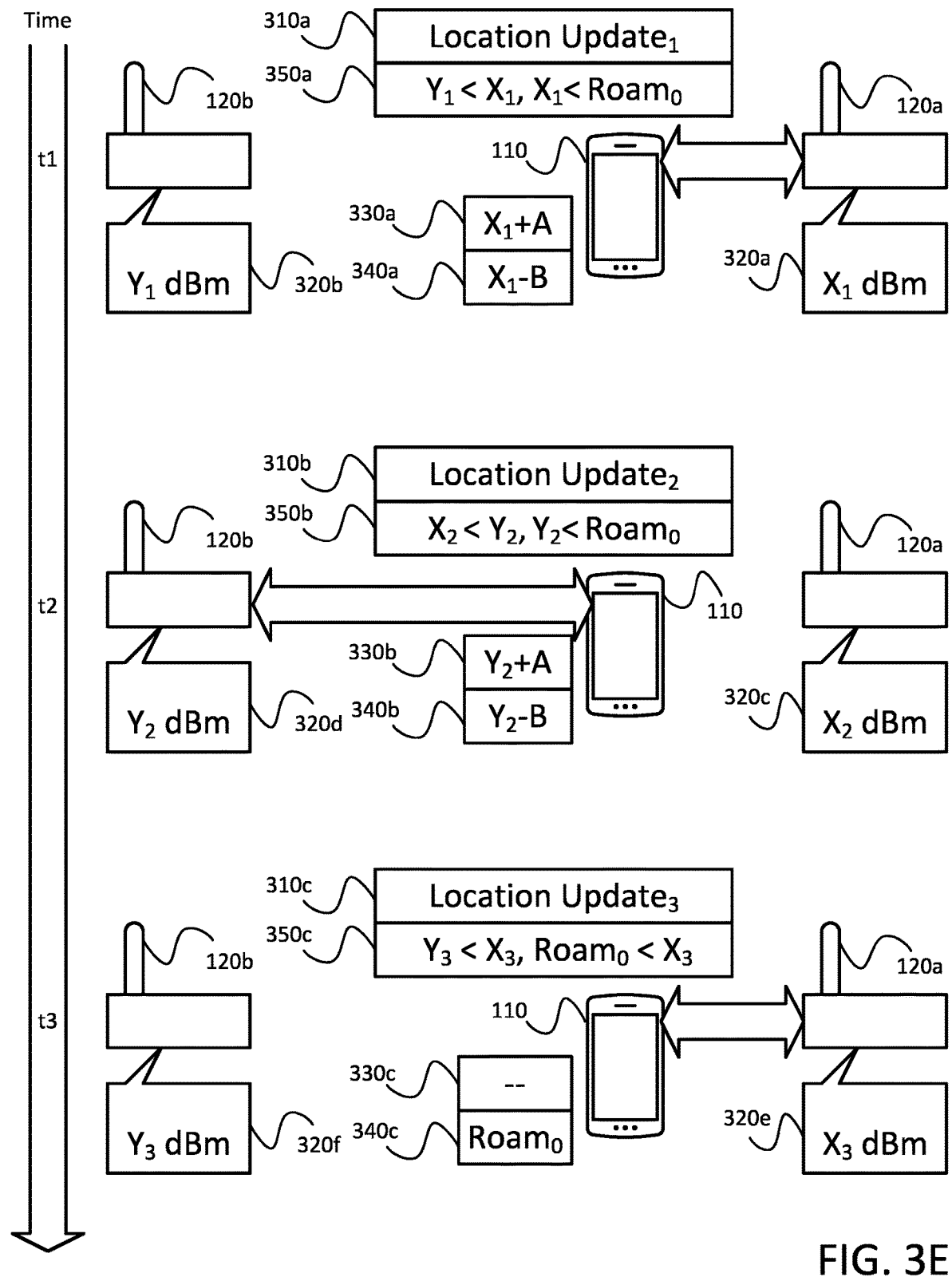

In FIG. 3E, the client device 110 uses locational updates as the roam scan conditions 310a-c, which may be used in addition to or instead of signal-strength based roam scan conditions 310. For example, if a client device 110 moves more than a threshold distance (e.g., at least Z meters) in an environment, even if the client device 110 observes signal strengths 320 from the connected-to AP 120 within the current roam scan hold range, the client device 110 can determine that performing a roam scan may potentially lead to discovering another AP 120 with a stronger available connection.

In the illustrated example of FIG. 3E, a client device 110 may be deployed at a first time $t_0$ one location for an extended period of time, while maintaining a best-available connection to an AP 120 observable at that location (e.g., avoiding roaming), which offers a signal strength 320a below the initial roam threshold. Accordingly, when the client device 110 reaches the first location, the client device 110 may perform a first iteration of method 200 discussed in relation to FIG. 2, thereby connecting to the first AP 120a and setting the upper boundary 330a and the lower boundary 340a based on the best signal strength 320a available (e.g., $X_1 > Y_1$) to avoid performing a roam scan unless the client device 110 either moves from the first location or observes a signal strength 320 from the connected AP 120a outside of the roam scan hold range.

In the example of FIG. 3E at the second time, the client device 110 has relocated to a second location, which acts as a second roam scan condition 310b to perform a roam scan. The second roam evaluation criteria 350b indicate that the second AP 120b offers the strongest network connection at the second time, but is still below the initial roam threshold. Accordingly, the client device 110 connects to the second AP 120 and updates the upper boundary 330b and the lower boundary 340b for use after the second time based on the observed signal strength 320d of the connected second AP 120b at the second time. Stated differently, the roam scan hold range for times $t_{2+x}$ are set based on the signal strength 320 seen at time $t_2$ for the AP 120 that the client device connects to (e.g., $Y_2+A$ and $Y_2-B$) to avoid switching back and forth between multiple APs 120 with similar signal strengths 320.

At a third time in FIG. 3E, the client device 110 has relocated to a third location, which acts as a third roam scan condition 310c to perform a roam scan. At this third time, the third roam evaluation criteria 350c indicate that the first AP 120a provides a signal strength 320e above the initial roam threshold, in addition to offering the strongest network connection. Accordingly, the client device 110 connects to the first AP 120a and updates roam scan hold range to the initial values. Stated differently, the roam scan hold range for times $t_{3+x}$ are set to the initial roam threshold (e.g., Roam$_0$) for the lower boundary 340c and to null for an upper boundary 330c, as the client device 110 does not need to roam when signal strength is above the initial roam threshold. In various embodiments, the roam scan performed to connect the client device 110 to the first AP 120a may be performed while the second AP 120b still offers a signal strength 320f within the roam scan hold range set at the second time (e.g., $Y_2-B < Y_3 < Y_2+A$).

When the signaling characteristics of a location are known to the client device 110 (e.g., based on past experience of the client device 110 at that location), the client device 110 may set different profiles for connectivity and how or whether to perform roam scans. For example, a user can move a client device 110 between an office, a conference room, and a shop floor, each with different observable signal strengths from the various APs 120 in the environment. These locations may correspond to a mapped region in the environment (e.g., the conference room) or may be set based on a distance from a location of the last roam scan (e.g., Z meters from a roam scan, which happed to be performed in the conference room).

In various embodiments, the location may be determined using a Global Positioning System (GPS) receiver included in the client device 110, an accelerometer in the client device 110, an indoor positioning system, timing or dead reckoning measurement for signal propagation to an AP 120, or the like.

The example scenarios provided in FIGS. 3A-3E illustrate some of the potential operations of the present disclosure to reduce or avoid unnecessary roam scan behavior, without disabling the behavior or requiring user-specified values for specific client devices 110. The examples scenarios provided in FIGS. 3A-3E are offered as non-limiting examples of how the present disclosure may be applied, and skilled artisans may combine any of the features discussed or illustrated herein as being within the intended scope.

Figure 4:
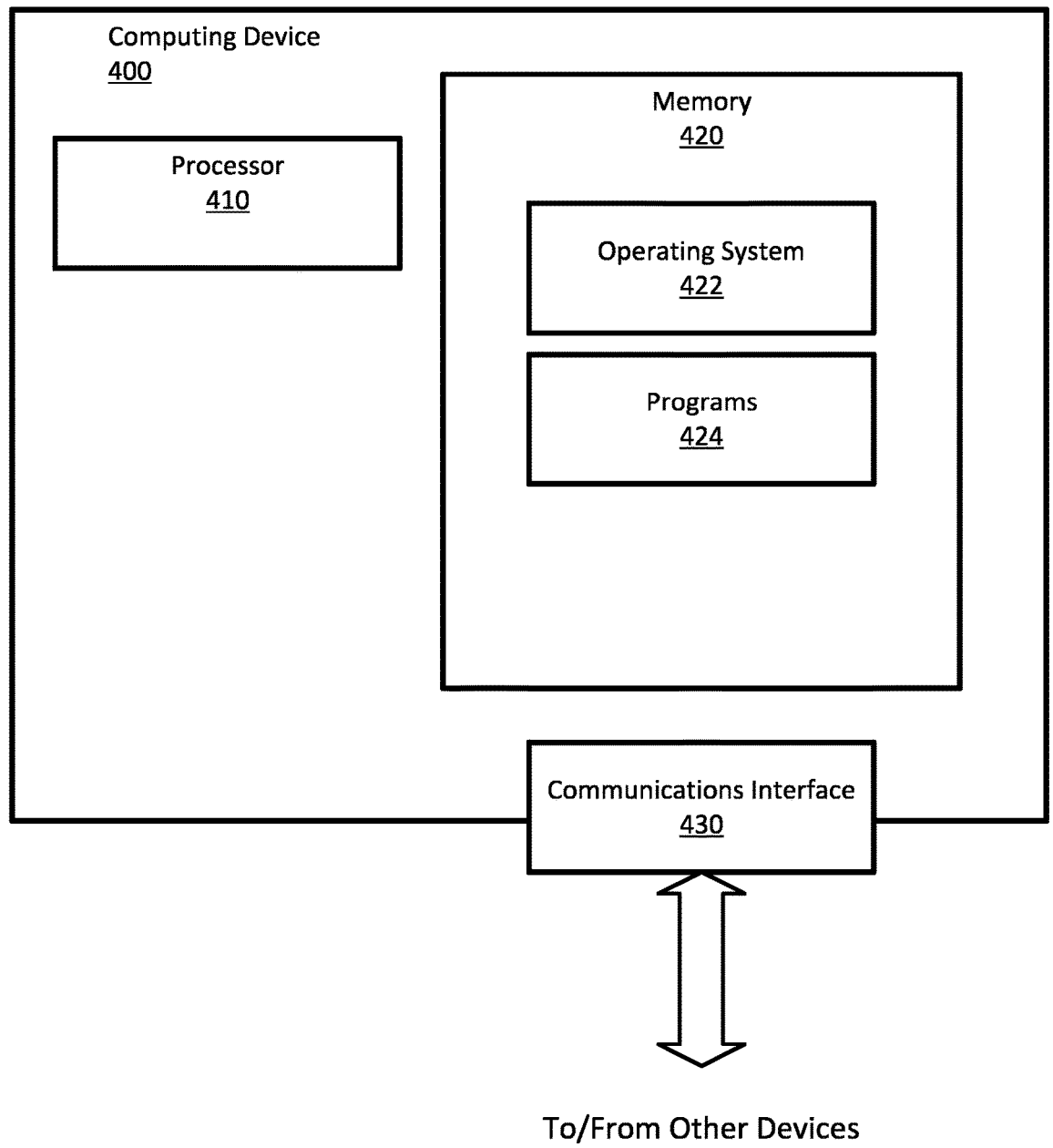
FIG. 4 illustrates a computing device, according to embodiments of the present disclosure.

FIG. 4 illustrates a computing device 400, such as may be used as a client device 110 or AP 120 according to embodiments of the present disclosure. The computing device 400 includes a processor 410, such as a central processing unit (CPU) and/or graphics processing unit (GPU), application-specific integrated circuit (ASIC), or the like, communicatively coupled with a non-transitory computer-readable storage medium such as a memory 420, e.g., a combination of volatile memory elements (e.g., random access memory (RAM)) and non-volatile memory elements (e.g., flash memory or the like). The memory 420 stores a plurality of computer-readable instructions in the form of applications, including an operating system 422 and one or more programs 424 by which the computing device 400 is instructed to perform various operations when the instructions are executed by the processor 410.

The computing device 400 also includes a communications interface 430, enabling the computing device 400 to establish connections with WLANs, such as the network implemented by the APs 120 described herein. The communications interface 460 can therefore include any suitable combination of transceivers, antenna elements, and corresponding control hardware enabling communications with client devices 110 and APs 120. In some examples, the program 424 resides within the communications interface 430 and is executed by a controller of the communications interface 430 distinct from the processor 410.

The computing device 400 can include further components (not shown), including output devices such as a display, a speaker, and the like, as well as input devices such as a keypad, a touch screen, a microphone, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   measuring, by a client device, network conditions in an environment in which the client device is currently connected to a first Access Point (AP);
   in response to determining that the client device allows roaming from the first AP and that the network conditions satisfy a roam scan condition:
      initiating a roam scan operation to identify at least one signal strength of one or more APs in the environment; and
      adjusting, by the client device, the roam scan condition to perform a subsequent roam scan, wherein the roam scan condition includes an upper boundary and a lower boundary based on the at least one signal strength identified during the roam scan:
   measuring, after adjusting the roam scan condition, second network conditions;
   in response to determining that the client device allows roaming from the first AP and that the second network conditions are outside of a roam scan hold range:
      initiating the subsequent roam scan to identify additional signal strengths for available APs in the environment, including a second signal strength for the first AP:
   in response to determining to remain connected to the first AP based on the additional signal strengths observed during the subsequent roam scan:
      maintaining, by the client device, a connection to the first AP; and
      adjusting, by the client device, the roam scan hold range as an updated candidate roam scan condition to perform a next roam scan, wherein the roam scan hold range includes a second upper boundary based on the second signal strength and a second lower boundary based on the second signal strength.

2. The method of claim 1, wherein:
   the network conditions include a first received signal strength indicator (RSSI) for the first AP;
   the client device determines that the roam scan condition is satisfied by identifying that the first RSSI is below an initial lower boundary for the roam scan hold range;
   the upper boundary is lower than an initial upper boundary of the roam scan hold range; and
   the lower boundary is lower than the initial lower boundary.

3. The method of claim 2, wherein
   no other APs besides the first AP are observable by the client device within the environment.

4. The method of claim 1, wherein:
   the network conditions include a first RSSI for the first AP;

the client device determines that the roam scan condition is satisfied by identifying that the first RSSI is above an initial upper boundary for the roam scan hold range;
the upper boundary is higher than the initial upper boundary; and
the lower boundary is higher that an initial lower boundary of the roam scan hold range.

5. The method of claim 1, wherein:
the network conditions include a changed location of the client device in the environment; and
the client device determines that the roam scan condition is satisfied in response to the client device moving a threshold distance in the environment or entering a new area defined in the environment.

6. The method of claim 1, further comprising:
measuring, after adjusting the roam scan condition, second network conditions;
in response to determining that the client device allows roaming from the first AP and that the second network conditions are outside of the roam scan hold range as adjusted:
 initiating the subsequent roam scan to identify additional signal strengths for available APs in the environment, including the second signal strength for the first AP and a third signal strength from a second AP;
in response to determining to connect to the second AP based on the additional signal strengths observed during the subsequent roam scan and the third signal strength exceeding the second signal strength by at least a re-association threshold:
 disconnecting, by the client device, a first connection with the first AP;
 establishing, by the client device, a second connection to the second AP; and
 adjusting, by the client device, the roam scan hold range as an updated candidate roam scan condition to perform a next roam scan, wherein the roam scan hold range includes a second upper boundary based on the third signal strength and a second lower boundary based on the third signal strength.

7. The method of claim 1, wherein the client device allows roaming from the first AP in response to at least one of:
the first AP providing a non-metered connection or the client device permitting roaming while connected via a metered connection;
the client device has not set the first AP as sole connection point or forbidden connecting to other APs observable in the environment;
the client device has consecutively connected to the first AP a threshold number of times in a corresponding number of roam scan attempts; or
a location of the client device has changed by a threshold distance since a previous roam scan attempt.

8. A system, comprising:
a processor; and
a memory including instructions that when executed by the processor perform operations including:
 measuring, by a client device, network conditions in an environment in which the client device is currently connected to a first Access Point (AP);
 in response to determining that the client device allows roaming from the first AP and that the network conditions satisfy a roam scan condition:
  initiating a roam scan operation to identify at least one signal strength of one or more APs in the environment; and
  adjusting, by the client device, the roam scan condition to perform a subsequent roam scan, wherein the roam scan condition includes an upper boundary and a lower boundary based on the at least one signal strength identified during the roam scan;
 measuring, after adjusting the roam scan hold range, second network conditions;
 in response to determining that the client device allows roaming from the first AP and that the second network conditions are outside of a roam scan hold range:
  initiating the subsequent roam scan to identify additional signal strengths for available APs in the environment, including a second signal strength for the first AP;
 in response to determining to remain connected to the first AP based on the additional signal strengths observed during the subsequent roam scan:
  maintaining, by the client device, the connection to the first AP; and
  adjusting, by the client device, the roam scan hold range as an updated candidate roam scan condition to perform a next roam scan, wherein the roam scan hold range includes a second upper boundary based on the second signal strength and a second lower boundary based on the second signal strength.

9. The system of claim 8, wherein:
the network conditions include a first RSSI for the first AP;
the client device determines that the first RSSI is outside of the roam scan hold range in a first direction of either above an initial upper boundary or below an initial lower boundary of the roam scan hold range;
the lower boundary replaces the initial lower boundary and is set a first offset from the first RSSI in the first direction; and
the upper boundary replaces the initial upper boundary and is set a second offset from the first RSSI in the first direction.

10. The system of claim 8, wherein:
the network conditions include a changed location of the client device in the environment; and
the client device determines that the roam scan condition is satisfied in response to the client device moving a threshold distance in the environment or entering a new area defined in the environment.

11. The system of claim 8, the operations further comprising:
measuring, after adjusting the roam scan condition, second network conditions;
in response to determining that the client device allows roaming from the first AP and that the second network conditions are outside of the roam scan hold range as adjusted:
 initiating the subsequent roam scan to identify additional signal strengths for available APs in the environment, including the second signal strength for the first AP and a third signal strength from a second AP;
in response to determining to connect to the second AP based on the additional signal strengths observed during the subsequent roam scan and the third signal strength exceeding the second signal strength by at least a re-association threshold:
 disconnecting, by the client device, a first connection with the first AP;
 establishing, by the client device, a second connection to the second AP; and adjusting, by the client device, the roam scan hold range as an updated candidate roam scan condition to perform a next roam scan, wherein the roam scan hold range includes a second upper boundary based on the third signal strength and a second lower boundary based on the third signal strength.

12. The system of claim 8, wherein
the client device allows roaming from the first AP in response to at least one of:
the first AP providing a non-metered connection or the client device permitting roaming while connected via a metered connection;
the client device has not set the first AP as sole connection point or forbidden connecting to other APs observable in the environment;
the client device has consecutively connected to the first AP a threshold number of times in a corresponding number of roam scan attempts; or
a location of the client device has changed by a threshold distance since a previous roam scan attempt.

13. A non-transitory memory storage device including instructions that when executed by a processor perform operations including:
measuring, by a client device, network conditions in an environment in which the client device is currently connected to a first Access Point (AP);
in response to determining that the client device allows roaming from the first AP and that the network conditions satisfy a roam scan condition:
initiating a roam scan operation to identify at least one signal strength of one or more APs in the environment; and
adjusting, by the client device, the roam scan condition to perform a subsequent roam scan, wherein the roam scan condition includes an upper boundary and a lower boundary based on the at least one signal strength identified during the roam scan;
measuring, after adjusting the roam scan hold range, second network conditions;
in response to determining that the client device allows roaming from the first AP and that the second network conditions are outside of the roam scan hold range:
initiating the subsequent roam scan to identify additional signal strengths for available APs in the environment, including a second signal strength for the first AP;
in response to determining to remain connected to the first AP based on the additional signal strengths observed during the subsequent roam scan:
maintaining, by the client device, a connection to the first AP; and
adjusting, by the client device, the roam scan hold range as an updated candidate roam scan condition to perform a next roam scan, wherein the roam scan hold range includes a second upper boundary based on the second signal strength and a second lower boundary based on the second signal strength.

14. The memory storage device of claim 13, wherein:
the network conditions include a first RSSI for the first AP;
the client device determines that the first RSSI is outside of a roam scan hold range in a first direction of either above an initial upper boundary or below an initial lower boundary of the roam scan hold range;
the lower boundary replaces the initial lower boundary and is set a first offset from the first RSSI in the first direction; and
the upper boundary replaces the initial upper boundary and is set a second offset from the first RSSI in the first direction.

15. The memory storage device of claim 13, wherein:
the network conditions include a changed location of the client device in the environment; and
the client device determines that the roam scan condition is satisfied in response to the client device moving a threshold distance in the environment or entering a new area defined in the environment.

16. The memory storage device of claim 13, the operations further comprising:
measuring, after adjusting the roam scan condition, second network conditions;
in response to determining that the client device allows roaming from the first AP and that the second network conditions are outside of the roam scan hold range as adjusted:
initiating the subsequent roam scan to identify additional signal strengths for available APs in the environment, including a second signal strength for the first AP and a third signal strength from a second AP;
in response to determining to connect to the second AP based on the additional signal strengths observed during the subsequent roam scan and the third signal strength exceeding the second signal strength by at least a re-association threshold:
disconnecting, by the client device, a first connection with the first AP;
establishing, by the client device, a second connection to the second AP; and
adjusting, by the client device, the roam scan hold range as an updated candidate roam scan condition to perform a next roam scan, wherein the roam scan hold range includes a second upper boundary based on the third signal strength and a second lower boundary based on the third signal strength.

17. The memory storage device of claim 13, wherein
the client device allows roaming from the first AP in response to at least one of:
the first AP providing a non-metered connection or the client device permitting roaming while connected via a metered connection;
the client device has not set the first AP as sole connection point or forbidden connecting to other APs observable in the environment;
the client device has consecutively connected to the first AP a threshold number of times in a corresponding number of roam scan attempts; or
a location of the client device has changed by a threshold distance since a previous roam scan attempt.

* * * * *